US009128717B2

(12) United States Patent
Chen et al.

(10) Patent No.: US 9,128,717 B2
(45) Date of Patent: Sep. 8, 2015

(54) DATA PROCESSING SYSTEM WITH THERMAL CONTROL

(75) Inventors: Zhi Kai Chen, Shanghai (CN); Lei Wang, Shanghai (CN); Yang Han, Sunnyvale, CA (US); Shaohua Yang, San Jose, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 616 days.

(21) Appl. No.: 13/446,111

(22) Filed: Apr. 13, 2012

(65) Prior Publication Data

US 2013/0232360 A1 Sep. 5, 2013

Related U.S. Application Data

(60) Provisional application No. 61/606,202, filed on Mar. 2, 2012.

(51) Int. Cl.
*G06F 1/32* (2006.01)

(52) U.S. Cl.
CPC ............ *G06F 1/3268* (2013.01); *G06F 1/3221* (2013.01); *Y02B 60/1246* (2013.01)

(58) Field of Classification Search
CPC ... G06F 1/3206; G06F 1/3221; G06F 1/3234; G06F 1/3268
USPC .................................................. 713/323, 324
See application file for complete search history.

(56) References Cited

U.S. PATENT DOCUMENTS

| 5,544,138 | A | 8/1996 | Bajorek et al. |
| 5,715,467 | A | 2/1998 | Jirgal |
| 6,973,583 | B2 | 12/2005 | Kobori |
| 6,983,389 | B1 | 1/2006 | Filippo |
| 7,049,771 | B2 | 5/2006 | Katanaya |
| 7,055,117 | B2 | 5/2006 | Yee |
| 7,203,857 | B2 | 4/2007 | Hamilton |
| 7,412,615 | B2 | 8/2008 | Yokota et al. |
| 7,529,958 | B2 | 5/2009 | Roth et al. |
| 7,640,440 | B2 * | 12/2009 | Reece et al. ................... 713/300 |

(Continued)

FOREIGN PATENT DOCUMENTS

| JP | 2004118240 | 4/2004 |
| WO | WO 2004/023268 | 3/2004 |
| WO | WO 2004/109531 | 12/2004 |

OTHER PUBLICATIONS

IBM, "Adaptive Power Management for Mobile Hard Drives", Apr. 1999, see www.almaden.ibm.com/almaden/mobile_hard_drives.html.

U.S. Appl. No. 13/339,403, Unpublished (filed Dec. 29, 2011) (Shaohua Yang).

(Continued)

*Primary Examiner* — Thuan Du
(74) *Attorney, Agent, or Firm* — Hamilton DeSanctis & Cha

(57) ABSTRACT

Various embodiments of the present invention provide systems and methods for a data processing system with thermal control. For example, a data processing system with thermal control is disclosed that includes a number of data processors and a scheduler, which is operable to determine the power consumption of the data processors and to switch the data processing system from a first mode to a second mode and from the second mode to a third mode. The data processing system consumes less power in the third mode than in the first mode. The second mode prepares the data processing system to enter the third mode.

20 Claims, 4 Drawing Sheets

(56) References Cited

U.S. PATENT DOCUMENTS

| | | |
|---|---|---|
| 7,739,533 B2 | 6/2010 | Rauschmayer |
| 7,779,331 B2 * | 8/2010 | Tan .............................. 714/758 |
| 8,239,700 B2 | 8/2012 | Nation |
| 8,245,061 B2 | 8/2012 | Rauschmayer |
| 8,245,064 B2 * | 8/2012 | Fulkerson et al. ............ 713/323 |
| 8,291,251 B2 | 10/2012 | Rauschmayer |
| 8,522,054 B2 * | 8/2013 | Qin et al. ...................... 713/300 |
| 2004/0107372 A1 * | 6/2004 | Morisawa ..................... 713/300 |
| 2007/0130482 A1 * | 6/2007 | Dahan et al. .................. 713/300 |
| 2010/0185142 A1 * | 7/2010 | Kamen et al. .................. 604/66 |
| 2010/0268917 A1 | 10/2010 | Nation et al. |
| 2010/0269074 A1 | 10/2010 | Nation |

OTHER PUBLICATIONS

U.S. Appl. No. 13/167,764, Unpublished (filed Jun. 24, 2011) (Zongwang Li).

U.S. Appl. No. 13/284,684, Unpublished (filed Oct. 28, 2011) (Shaohua Yang).

U.S. Appl. No. 13/167,760, Unpublished (filed Jun. 24, 2011) (Changyou Xu).

U.S. Appl. No. 13/227,557, Unpublished (filed Sep. 8, 2011) (Shaohua Yang).

U.S. Appl. No. 13/369,069, Unpublished (filed Feb. 8, 2012) (Fan Zhang).

U.S. Appl. No. 13/364,217, Unpublished (filed Feb. 1, 2012) (Shaohua Yang).

* cited by examiner

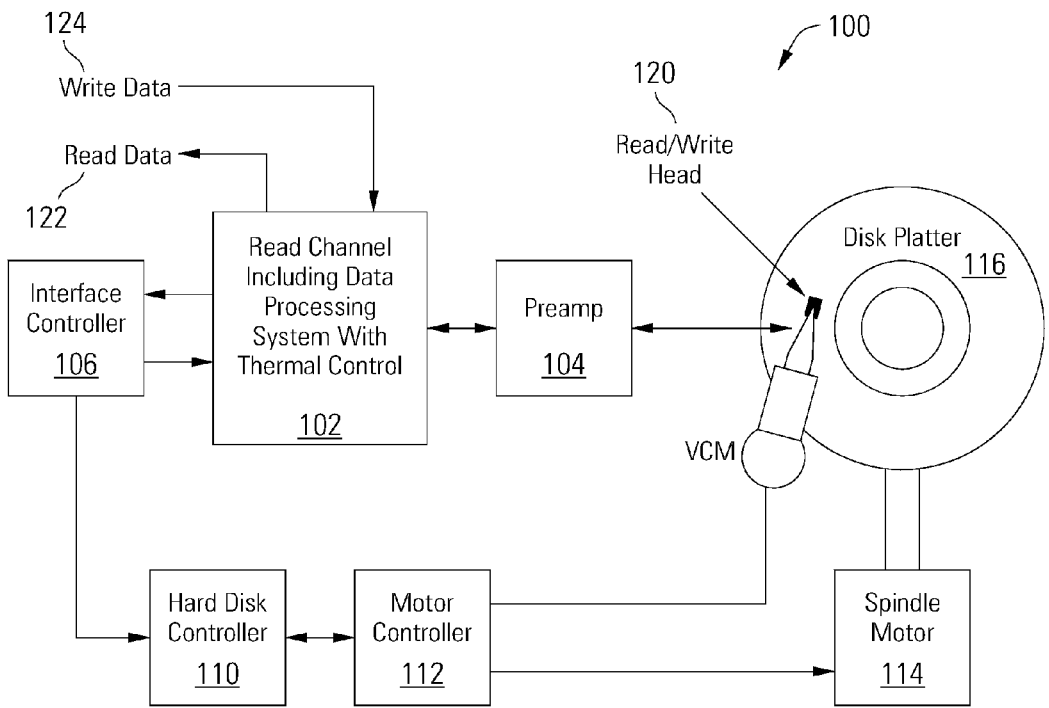
FIG. 1
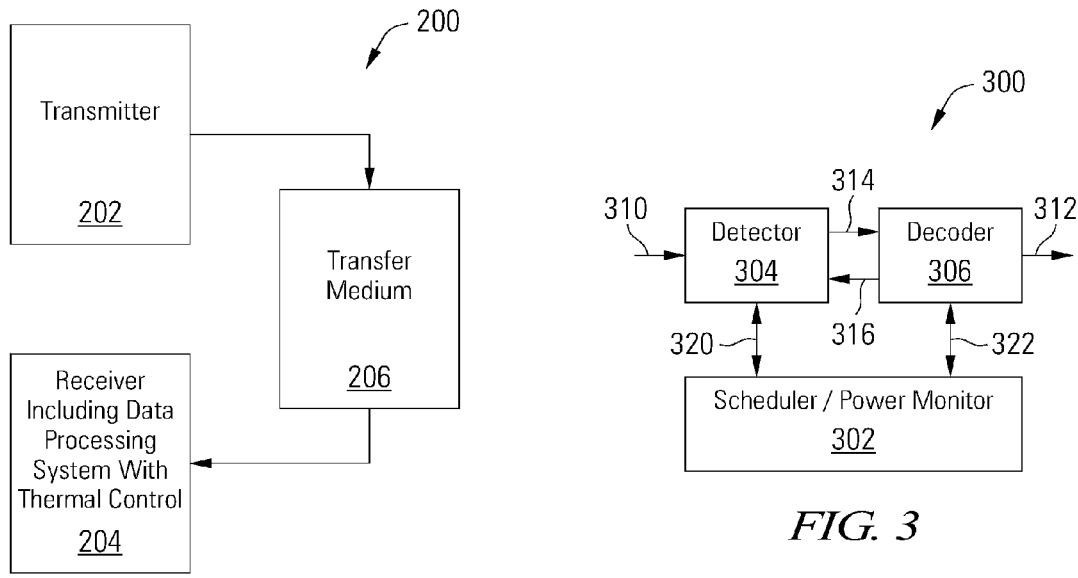
FIG. 2
FIG. 3

DATA PROCESSING SYSTEM WITH THERMAL CONTROL

CROSS REFERENCE TO RELATED APPLICATIONS

The present application claims priority to (is a non-provisional of) U.S. Pat. App. No. 61/606,202, entitled "Data Processing System with Thermal Control", and filed Mar. 2, 2012 by Chen et al, the entirety of which is incorporated herein by reference for all purposes.

BACKGROUND

Various data transfer systems have been developed including storage systems, cellular telephone systems, and radio transmission systems. In each of the systems data is transferred from a sender to a receiver via some medium. For example, in a storage system, data is sent from a sender (i.e., a write function) to a receiver (i.e., a read function) via a storage medium. As information is stored and transmitted in the form of digital data, errors are introduced that, if not corrected, can corrupt the data and render the information unusable. The effectiveness of any transfer is impacted by any losses in data caused by various factors. Many types of data processors have been developed to detect and correct errors in digital data. For example, data detectors and decoders such as Maximum a Posteriori (MAP) detectors and Low Density Parity Check (LDPC) decoder may be used to detect and decode the values of data bits or multi-bit symbols retrieved from storage or transmission systems. Such data processing systems may be integrated into integrated circuits.

As data processing systems in integrated circuits are operated, they generate heat. If the temperature of an integrated circuit becomes excessive, it can cause malfunctions and even damage to the integrated circuit.

A need exists for thermal control of data processing systems to meet thermal targets for an integrated circuit while minimizing performance loss.

BRIEF SUMMARY

Various embodiments of the present invention provide systems and methods for a data processing system with thermal control. For example, a data processing system with thermal control is disclosed that includes a number of data processors and a scheduler, which is operable to determine the power consumption of the data processors and to switch the data processing system from a first mode to a second mode and from the second mode to a third mode. The data processing system consumes less power in the third mode than in the first mode, thereby reducing the temperature of the integrated circuit containing the data processing system. The second mode prepares the data processing system to enter the third mode, for example ensuring that adequate free space is available in internal data queues to prevent overflow when entering the third mode and disabling resources. In some embodiments, the data processors include a number of Maximum a Posteriori (MAP) detectors and a Low Density Parity Check (LDPC) decoder. In some instances, the scheduler is operable to switch the data processing system from the first mode to the second mode when the power consumption of the data processing system has exceeded a threshold for a predetermined duration and from the third mode to the first mode when the power consumption has been below a threshold for a predetermined duration. In some cases, the data processing system includes memory to buffer data between the data processors, and the scheduler applies kick-out rules in the second mode to increase a data output rate to increase free space in the at least one memory. The scheduler is operable to switch the data processing system from the second mode to the third mode after a predetermined amount of free space is available in the memory. In some cases, the scheduler is operable to determine the power consumption by adding a power consumption weight of each of the data processors which are active to yield a power sum, and by calculating a moving average of the power sum using a window to yield an estimate of the power consumption.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 1 depicts a storage system including a data processing system with thermal control in accordance with various embodiments of the present invention;

FIG. 2 depicts a wireless communication system including a data processing system with thermal control in accordance with various embodiments of the present invention;

FIG. 3 depicts a block diagram of a data processing system with thermal control in accordance with various embodiments of the present invention;

DETAILED DESCRIPTION OF THE INVENTION

Figure 4:
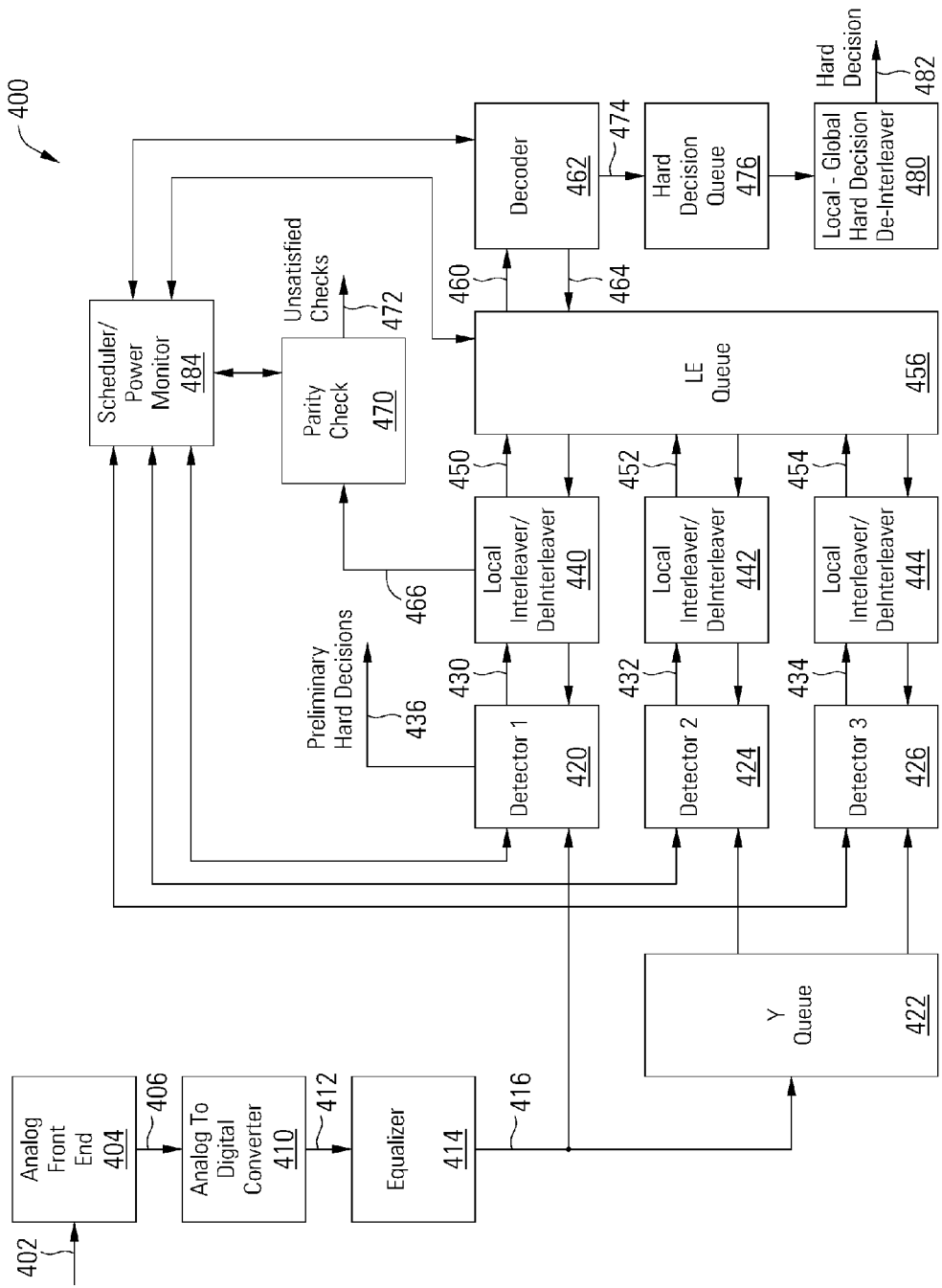
FIG. 4 depicts a block diagram of a data processing system with thermal control in accordance with various embodiments of the present invention.

Various embodiments of the present invention are related to apparatuses and methods for data processing systems with thermal control. Power consumption in multiple components in a data processing systems is monitored, for example by calculation or measurement, and activity of the components is adjusted to control the temperature of the chip or chips containing the data processing system. Intelligent thermal control of the data processing system is implemented using self-adapting switching between a normal power mode and a low power mode, providing flexibility to meet a thermal control target while reducing performance degradation.

In some embodiments, the data processing system includes a number of data detectors and at least one data decoder to determine the value of data bits in an iterative process, although the data processor with thermal control is not limited to this configuration. At least one of the data detectors can be enabled and disabled during operation to switch between the normal power mode and the low power mode, thereby adjusting the temperature of the data processing system. In embodiments based on calculated power consumption in the data processing system, dynamic power estimation is used for components included in the power calculation.

A scheduler is used to schedule data flow through processors such as detectors and decoders in the data processing system and through internal memory queues in the data processing system, allocating data words in internal queues and controlling each processor, for example by allocating the position of each codeword being detected and decoded and by managing the global iteration including detector scheduler, decoder scheduler, and kick-out decision in a read channel data processor.

In order to provide smooth switching between the normal power mode and the low power mode in which at least one of the processors is disabled, the scheduler speeds up the kick-out of data from the data processor, freeing space in internal memory queues, before switching to low power mode. This prevents memory overflows when switching from normal power mode to low power mode that might otherwise occur when a processor is disabled.

The scheduler may also be operable to flexibly provide different processing power for different data blocks or sectors. Data blocks with high signal to noise ratio (SNR) can be kicked out of the data processing system with the minimal number of global and local iterations, while noisy data blocks can be processed with more global and/or local iterations, at least matching the overall kick-out speed from the data processing system with the input speed from a data source such as a hard disk controller.

The scheduler may also be operable to control the number of local iterations in detectors and/or decoder, for example performing more local iterations in a decoder when in low power mode and fewer detectors are available for global iterations, thereby compensating for fewer global iterations in the detectors and decoder with increased local iterations in the decoder.

In some embodiments, the data processing system's dynamic power consumption is calculated by determining the power consumption of each processor and memory queue, for example using power analysis tools at design time, and then during operation, calculating the average active ratio value for power consumed by active processors and memory queues on the fly. The dynamic power consumption in the data processing system is estimated using a moving window based on the power consumption of active processors and memory queues.

The data processing system with thermal control can smoothly switch between operating modes with different power consumption rates, preventing the chip or chips from overheating while reducing impact on performance. The thermal control techniques disclosed herein may be applied to large and small scale systems, and may be operable to automatically provide different resources in the data processing system to handle different tasks.

Although the data processing system with thermal control disclosed herein is not limited to any particular application, several examples of applications are presented in FIGS. 1 and 2 that benefit from embodiments of the present invention. Turning to FIG. 1, a storage system 100 is illustrated as an example application of a data processing system with thermal control in accordance with some embodiments of the present invention. The storage system 100 includes a read channel circuit 102 with a data processing system with thermal control in accordance with some embodiments of the present invention. Storage system 100 may be, for example, a hard disk drive. Storage system 100 also includes a preamplifier 104, an interface controller 106, a hard disk controller 110, a motor controller 112, a spindle motor 114, a disk platter 116, and a read/write head assembly 120. Interface controller 106 controls addressing and timing of data to/from disk platter 116. The data on disk platter 116 consists of groups of magnetic signals that may be detected by read/write head assembly 120 when the assembly is properly positioned over disk platter 116. In one embodiment, disk platter 116 includes magnetic signals recorded in accordance with either a longitudinal or a perpendicular recording scheme.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). Once read/write head assembly 120 is positioned adjacent the proper data track, magnetic signals representing data on disk platter 116 are sensed by read/write head assembly 120 as disk platter 116 is rotated by spindle motor 114. The sensed magnetic signals are provided as a continuous, minute analog signal representative of the magnetic data on disk platter 116. This minute analog signal is transferred from read/write head assembly 120 to read channel circuit 102 via preamplifier 104. Preamplifier 104 is operable to amplify the minute analog signals accessed from disk platter 116. In turn, read channel circuit 102 decodes and digitizes the received analog signal to recreate the information originally written to disk platter 116. This data is provided as read data 122 to a receiving circuit. As part of decoding the received information, read channel circuit 102 processes the received signal using a data processing system with thermal control. Such a data processing system with thermal control may be implemented consistent with that disclosed below in relation to FIGS. 3-4. In some cases, the data processing may be performed consistent with the flow diagram disclosed below in relation to FIG. 5. A write operation is substantially the opposite of the preceding read operation with write data 124 being provided to read channel circuit 102. This data is then encoded and written to disk platter 116.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

Turning to FIG. 2, a wireless communication system 200 or data transmission device including a receiver 204 with a data processing system with thermal control is shown in accordance with some embodiments of the present invention. Communication system 200 includes a transmitter 202 that is operable to transmit encoded information via a transfer medium 206 as is known in the art. The encoded data is received from transfer medium 206 by receiver 204. Receiver 204 incorporates a data processing system with thermal control. Such a data processing system with thermal control may be implemented consistent with that described below in relation to FIGS. 3-4. In some cases, the data processing may be done consistent with the flow diagram discussed below in relation to FIG. 5.

Turning to FIG. 3, a data processing system with thermal control 300 includes a scheduler 302 which monitors power consumption in a detector 304 and decoder 306, and which controls an operating mode in the detector 304 and decoder 306 to control the temperature of a chip or chips containing the data processing system with thermal control 300. Detector 304 is used to perform a data detection process on data received from a data input 310, determining the likelihood that each bit or symbol in the data from data input 310 has a particular value. In some embodiments, the output 314 from detector 304 contains log likelihood ratio (LLR) values for each bit or symbol in a block of data, representing the probability of each possible value of the bits or symbols. The detector 304 may include one or more data detection circuits, for example determining the LLR values using an algorithm such as a Viterbi algorithm or a Maximum A Postierori algorithm. The activity and thus the power consumption of the detector 304 may be controllable by the scheduler 302.

The output 314 from detector 304 is provided to decoder 306 to perform a data decoding function on the output 314 from detector 304 to generate hard decisions at the output 312 of the decoder 306. The hard decisions at the output 312 represent the actual values of bits or symbols in the data input 310 or of codewords representing bits or symbols in the data input 310. For example, the decoder 306 may perform parity checks to determine the actual values of bits or symbols. The decoder 306 may perform multiple local iterations on the output 314 from detector 304, repetitively processing the output 314 until the data converges to yield hard decisions for the output 312. In some embodiments, the decoder 306 may implement a low density parity check algorithm to decode the output 314 from detector 304. The decoder 306 may also provide LLR values resulting from the decoding process at a feedback 316 to the detector 304, enabling the detector 304 and decoder 306 to perform multiple global detection and decoding iterations on the data to yield the hard decisions for output 312. The activity and thus the power consumption of the decoder 306 may be controllable by the scheduler 302. For example, the maximum number of local iterations that may be performed by the decoder 306 may be set or affected by the scheduler 302, in order to control the power consumed when decoding a data block as well as the decoding latency for the data block.

Control signals 320 and 322 enable the scheduler 302 to obtain status from the detector 304 and decoder 306 and to configure the detector 304 and decoder 306 to perform detection and decoding operations. The scheduler 302 monitors the power consumption in the detector 304 and decoder 306, which may vary during normal operation based on the condition of the data at data input 310. If the data at data input 310 has no errors or few errors, the power consumption in detector 304 and decoder 306 will not rise and lead to excessively high temperatures. If the data at data input 310 is particularly noisy or contains many errors, it will be slower to converge in the detector 304 and decoder 306, requiring a greater number of iterations, increasing power consumption and temperature. When the scheduler 302 detects the rising power consumption in the detector 304 and decoder 306, it intelligently prepares the detector 304 and decoder 306 to switch to low power mode, then switches them to low power mode, while configuring the detection and decoding operations to reduce performance loss while in low power mode. When the power consumption in the detector 304 and decoder 306 falls, the scheduler 302 returns them to normal full power mode.

Turning to FIG. 4, another embodiment of a data processing system with thermal control 400 is depicted in accordance with various embodiments of the invention. The data processing system with thermal control 400 is used to process an analog signal 402 and to retrieve user data bits from the analog signal 402 without errors. In some cases, analog signal 402 is derived from a read/write head assembly in a magnetic storage medium. In other cases, analog signal 402 is derived from a receiver circuit that is operable to receive a signal from a transmission medium. The transmission medium may be wireless or wired such as, but not limited to, cable or optical connectivity. The data processing system with thermal control may be applied to processing data transmitted over virtually any channel or stored data retrieved from virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives. Based upon the disclosure provided herein, one of ordinary skill in the art will recognize a variety of sources from which analog signal 402 may be derived.

The data processing system with thermal control 400 includes an analog front end 404 that receives and processes the analog signal 402. Analog front end 404 may include, but is not limited to, an analog filter and an amplifier circuit as are known in the art. Based upon the disclosure provided herein, one of ordinary skill in the art will recognize a variety of circuitry that may be included as part of analog front end 404. In some cases, the gain of a variable gain amplifier included as part of analog front end 404 may be modifiable, and the cutoff frequency and boost of an analog filter included in analog front end 404 may be modifiable. Analog front end 404 receives and processes the analog signal 402, and provides a processed analog signal 406 to an analog to digital converter 410.

Analog to digital converter 410 converts processed analog signal 406 into a corresponding series of digital samples 412. Analog to digital converter 410 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 412 are provided to an equalizer 414. Equalizer 414 applies an equalization algorithm to digital samples 412 to yield an equalized output 416. In some embodiments of the present invention, equalizer 414 is a digital finite impulse response filter circuit as is known in the art. Data or codewords contained in equalized output 416 may be provided to a data detector 420, and may be stored in a buffer 422 or Y queue until other data detectors 424 and 426 are available for processing.

The data detectors 420, 424 and 426 perform a data detection process on the received input, resulting in detected outputs 430, 432 and 436, respectively. In some embodiments of the present invention, data detectors 420, 424 and 426 are Viterbi detectors or MAP detectors. In these embodiments, the detected outputs 430, 432 and 436 contain LLR information about the likelihood that each bit or symbol has a particular value. Based upon the disclosure provided herein, one of ordinary skill in the art will recognize a variety of data detectors that may be used in relation to different embodiments of the present invention. Data detector 420 is started based upon availability of data at equalized output 416, and thus operates on new data from equalizer 414. Data detectors 424 and 426 may be started based upon availability of a data set in buffer 422 from equalizer 414 or another source, and thus operate on old data or data that has been previously processed in a global iteration of the data processing system with thermal control 400. Data detectors 420, 424 and 426 yields detected outputs 430, 432 and 434 that include soft data. As used herein, the phrase "soft data" is used in its broadest sense to mean reliability data with each instance of the reliability data indicating a likelihood that a corresponding bit position or group of bit positions has been correctly detected. In some embodiments of the present invention, the soft data or reliability data is log likelihood ratio data as is known in the art. At least detected output 430 also includes preliminary hard decisions 436 which may be used to control timing loops in the data processing system with thermal control 400.

The detected outputs 430, 432 and 434 from data detectors 420, 424 and 426 are provided to local interleaver/deinterleavers 440, 442 and 444, respectively, that protect data against burst errors. Burst errors overwrite localized groups or bunches of bits. Because LDPC decoders are best suited to correcting errors that are more uniformly distributed, burst errors can overwhelm LDPC decoders. The interleaver/deinterleavers 440, 442 and 444 prevent this by interleaving or shuffling each of the detected outputs 430, 432 and 434 from data detectors 420, 424 and 426 to yield interleaved outputs 450, 452 and 454 which are stored in a memory 456 or LE queue. Interleaver/deinterleavers 440, 442 and 444 may be any circuit known in the art that is capable of shuffling data sets to yield a rearranged data set. The interleaved output 460 from the memory 456 is provided to an LDPC decoder 462 which performs parity checks on the interleaved output 460, ensuring that parity constraints established by an LDPC encoder (not shown) before storage or transmission are satisfied in order to detect and correct any errors that may have occurred in the data during storage or transmission or during processing by other components of the data processing system with thermal control 400.

Multiple detection and decoding iterations may be performed in the data processing system with thermal control 400, referred to herein as global iterations. (In contrast, local iterations are decoding iterations performed within the decoder 462.) To perform a global iteration, LLR values 464 from the decoder 462 are stored in memory 456, deinterleaved in interleaver/deinterleavers 440, 442 and 444 to reverse the process previously applied by interleaver/deinterleavers 440, 442 and 444, and provided again to the data detectors 420, 424 and 426. The data detectors 420, 424 and 426 are thus able to repeat the data detection process, aided by the LLR values 464 from the decoder 462. In this manner, the data processing system with thermal control 400 can perform multiple global iterations, allowing the data detectors 420, 424 and 426 and LDPC decoder 462 to converge on the correct data values.

Deinterleaved LLR values 466 from interleaver/deinterleaver 440 are provided to a parity check circuit 470, which calculates the number of unsatisfied parity checks 472 in the data being processed in data processing system with thermal control 400. The number of unsatisfied parity checks 472 may be used to determine whether data has converged in the data processing system with thermal control 400 and for other purposes such as bit or symbol flipping or subsequent error correction techniques.

The decoder 462 also produces hard decisions 474 about the values of the data bits or symbols. For binary data bits, the hard decisions may be represented as 0's and 1's. For multi-level symbols, such as those in a Galois Field (GF) 4 LDPC decoder, the hard decisions may be represented by field elements 00, 01, 10 and 11.

The hard decisions 474 from decoder 462 are stored in a hard decision queue 476 and deinterleaved in a local-global hard decision deinterleaver 480, reversing the process applied in local interleaver/deinterleavers 440, 442 and 444 and any global interleavers (not shown), and yielding hard decisions 482.

A scheduler 484 is provided to control the kick-out rules for the data processing system with thermal control 400, including the maximum number of local iterations that are performed in decoder 462 and the maximum number of global iterations that are performed in decoder 462 and in the data detectors 420, 424 and 426 before data is kicked out of the data processing system with thermal control 400. The scheduler 484 monitors the power usage of data processors in the data processing system with thermal control 400, including the data detectors 420, 424 and 426, the decoder 462, memory queue 456. In other embodiments, the scheduler 484 also monitors power usage of the parity check circuit 470, or of any components which utilize a relatively significant amount of power and play a significant role in heating the chip. The scheduler 484 enables and disables data processors (e.g., data detector 426) to switch between normal power mode and low power mode in the data processing system with thermal control 400. The scheduler 484 allocates the position for each codeword in queues (e.g., 422 and 456), establishing the data path through the data processing system with thermal control 400 and selecting detector 424 or detector 426 to process data during a global iteration.

The data processing system with thermal control 400 is an iterative codec with a client-server architecture, although it is not limited to this configuration or control scheme, and the number and type of data detectors 420, 424 and 426 and decoder 462 in the system of FIG. 4 are non-limiting examples. The data processing system with thermal control may be applied to any system which uses multiple processors for data processing. The data detectors 420, 424 and 426 and decoder 462 are shared across the data processing system with thermal control 400 for different data blocks or sectors. The memory queues 422 and 456 are used to store data from one processor and feed it to another. The queue based system provides flexibility in applying different processing power for different sectors. High SNR sectors can be kicked out of the system as they converge with a relatively small number of local and global iterations, while more local and global iterations are applied to noisier sectors.

In some embodiments, the data processing system with thermal control 400 has two operating modes, a normal mode or full power mode, and a low power mode. The low power mode disables one or more resources in the data processing system with thermal control 400 to reduce overall power consumption in comparison with the power consumption when in normal mode. The data processing system with thermal control 400 uses intelligent switching between the normal mode and the low power mode, preparing for the switch by, for example, speeding up data kick-out during a pre-low power mode before switching to low power mode from normal mode in order to free up space in buffer 422 and/or memory 456. The data processing system with thermal control 400 may also customize resource allocation in the low power mode.

In some embodiments, the scheduler disables data detector 426 in low power mode, leaving data detector 420 for new data from equalizer 414 and data detector 424 for global iterations, processing LLR values 464 from decoder 462. The scheduler also adjusts the maximum number of local iterations that can be performed by decoder 462 if data does not converge before the data is kicked out from the data processing system with thermal control 400. Factors considered in establishing the maximum local iterations in decoder 462 may include balancing the number of local iterations needed to achieve the desired decoding performance, given the number of global iterations that may be performed without overflowing buffers. The scheduler may also insert idle state cycles in the decoder 462 to further reduce power consumption to control the chip temperature. The scheduler may also apply different kick-out rules for the data processing system with thermal control 400 in low power mode, causing data sectors to be kicked out earlier if they fail to converge by reducing the maximum number of global iterations. This releases resources in the data processing system with thermal control 400 earlier, after which other solutions may be used to further process kicked-out data.

In other embodiments, the data processing system with thermal control may have more than two operating modes, with each operating mode providing different power consumption levels and/or different resource allocation for different tasks. In such embodiments, a scheduler in the data processing system may be operable to intelligently switch between various operating modes and to allocate resources based on the operating mode.

Figure 5:
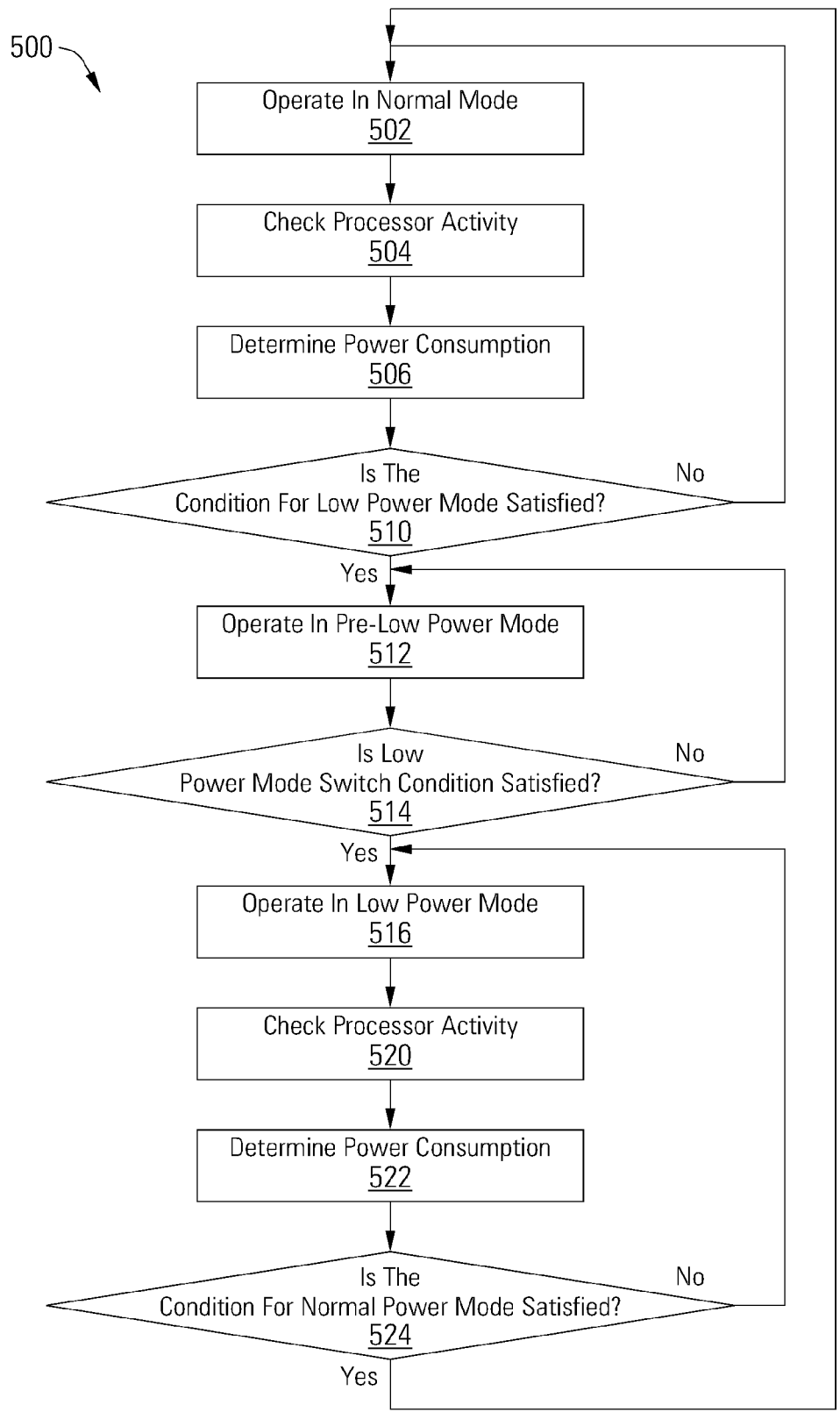
FIG. 5 depicts a flow diagram showing a method for switching modes while processing data in a data processing system with thermal control in accordance with various embodiments of the present invention.

Turning to FIG. 5, a flow diagram 500 depicts a method for switching modes while processing data in a data processing system with thermal control in accordance with various embodiments of the present invention. Following flow diagram 500, the data processing system operates in normal mode. (Block 502) This may or may not be the initial operating mode of the data processing system. The processor activity is checked, determining whether particular processors in the data processing system are active or inactive, and, in some embodiments, determining an activity level. (Block 504) This may be accomplished by checking state registers representing the operating mode of each processor in the data processing system, or by directly monitoring the activity of each processor, or in other manners. The power consumption of the data processing system is determined. (Block 506) This gives an indirect representation of the temperature of the chip or chips containing the data processing system, as increased power consumption generally leads to elevated temperature. The power consumption may be estimated using calculations as will be disclosed in more detail below, or may be directly measured. A determination is made as to whether the data processing system should enter low power mode. (Block 510) For example, a scheduler in the data processing system may determine that the data processing system should enter low power mode if the power consumption has exceeded a first threshold for a particular amount of time. If not, the data processing system continues to operate in normal mode. (Block 502) If so, the data processing system operates in a pre-low power mode to prepare for a low power mode. (Block 512) In the pre-low power mode, the data processing system prepares for low power mode operation, for example clearing space in queues so that when processors are disabled in low power mode, the queues will not overflow. In some embodiments, this includes modifying kick-out rules to specify fewer global processing iterations before data is output and cleared from the queues. A determination is made as to whether the conditions are right for the data processing system to switch to low power mode. (Block 514) For example, the scheduler may be operable to switch the data processing system from pre-low power mode to low power mode when a predetermined amount of free space is available in queues (e.g., 422 and 456). If not, the data processing system continues to operate in pre-low power mode. (Block 512) If so, the data processing system switches to low power mode, for example disabling a data detector 426 or other processor or resource. (Block 516) Switching to low power mode may also comprise changing kick-out rules, specifying maximum local and global iterations, inserting idle states in the schedule for decoder operation, or other changes that reduce power consumption. While operating in low power mode, the processor activity is monitored (block 520) and power consumption is determined. (Block 522) Processor activity monitoring and power consumption determinations may be performed in parallel with mode switching, switch condition determinations, and detection/decoding operations, and may be performed continually or periodically. They may be scheduled operations or event-triggered. A determination is made as to whether the data processing system should enter normal mode. (Block 524) For example, a scheduler in the data processing system may determine that the data processing system should switch from low power mode to normal mode if the power consumption has been lower than a second threshold for a particular amount of time. If not, the data processing system continues to operate in low power mode. (Block 516) If so, the data processing system switches to normal mode. (Block 502) Other mode transitions are included in other embodiments, for example transitioning from pre-low power mode back to normal mode if processor activity drops a given amount while still in pre-low power mode.

In some embodiments, power consumption in a data processing system is estimated by adding the predetermined power consumption weights of each active processor in the data processing system. The power consumption weights for each processor indicate the amount of power normally consumed by the processor when it is active, relative to the amount of power normally consumed by other processors. For example, in the data processing system with thermal control 400 of FIG. 4, the power consumed by the data detectors 420, 424, 426, and the decoder 462, and the memory queue 456 is included in the power consumption calculation. In some embodiments, the power consumed by parity check circuit 470 or other components is also included. The data detectors 420, 424 and 426 are assigned weights P1, P2 and P3, for example, of 5, respectively. The decoder 462 is assigned weight P4, for example, of 15, indicating that it consumes roughly three times the power as each of the data detectors 420, 424 and 426. The parity check circuit 470 is assigned weight P5, for example, of 10, indicating that it consumes roughly twice the power as each of the data detectors 420, 424 and 426. Activity indicators a1, a2, a3, a4 and a5 are generated for data detectors 420, 424, 426, decoder 462, and parity check circuit 470, respectively. In some embodiments, activity indicators a1-a5 are set to 1 when their corresponding processor is active and 0 when inactive or disabled. In other embodiments in which processor activity may be scaled back or reduced rather than just enabled or disabled, activity indicators a1-a5 are set to values between 0 and 1 based on their level of activity. For example, if a processor is running at a level that consumes about half the full power level, its activity indicator may be set to 0.5. The power consumption (Power) is calculated in some instances of these embodiments according to Equation 1:

$$\text{Power}=P5*a5+P4*a4+P3*a3+P2*a2+P1*a1 \qquad (\text{Eq 1})$$

A moving average of the power consumption (Power_estimate) is calculated in some embodiments according to Equations 2 and 3:

$$\text{Power\_sum}(n)=\text{Power\_sum}(n-1)+\text{Power}(n)-\text{Power\_estimate}(n-1) \qquad (\text{Eq 2})$$

$$\text{Power\_estimate}(n)=\text{Power\_sum}(n)/LP\_WIN \qquad (\text{Eq 3})$$

where LP_ WIN is the width of a window over which power consumption is monitored and averaged, measured as the number of Power calculations included within the window. In some embodiments, the LP_WIN window width is a selectable parameter which can be changed during operation.

Figure 6:
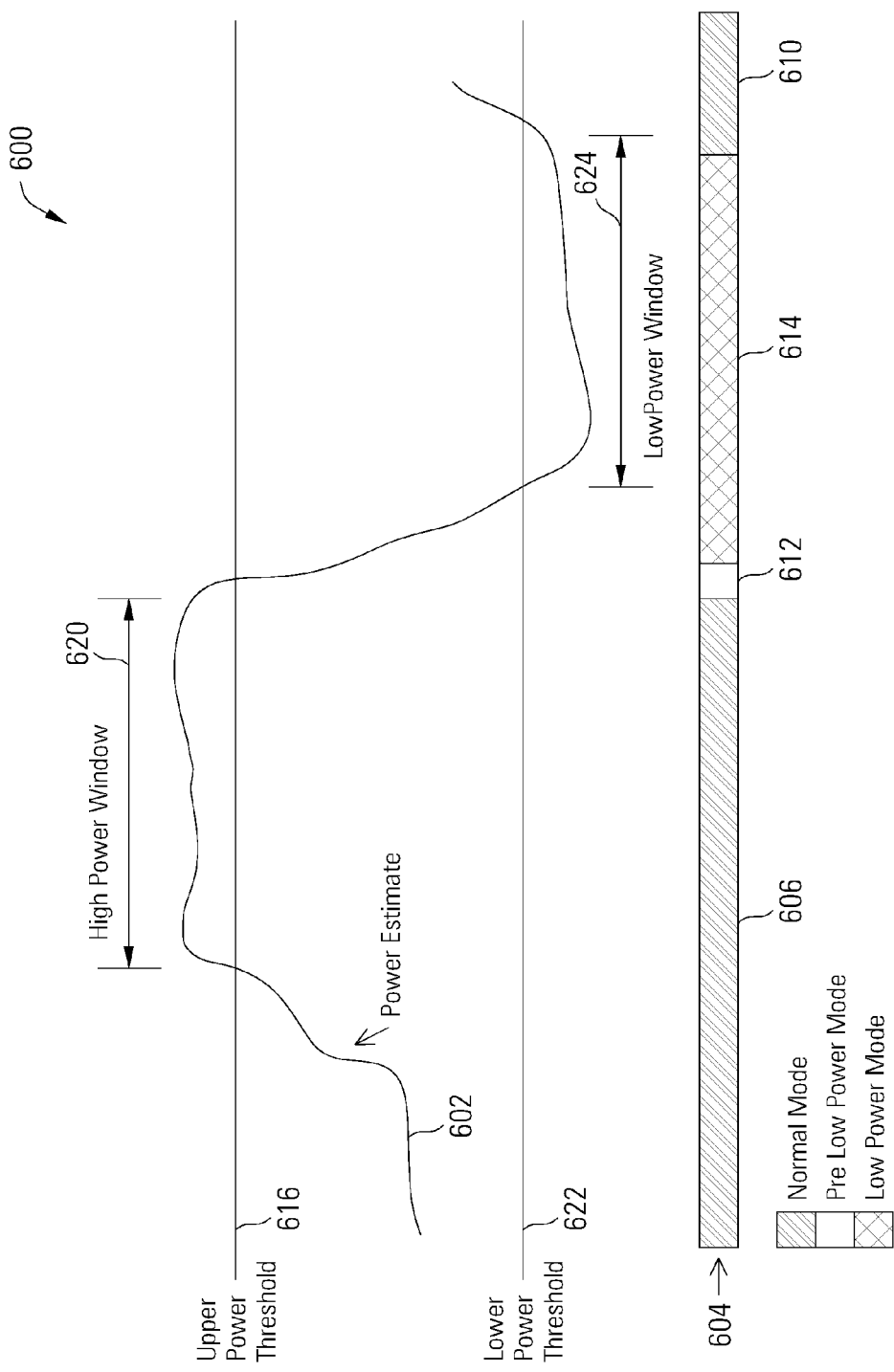
FIG. 6 depicts a plot of estimated power consumption in a data processing system with thermal control correlated to operating mode switching in the data processing system in accordance with various embodiments of the present invention.

Turning to FIG. 6, a plot 600 of Power_estimate is depicted, illustrating the operating mode switching in a data processing system in accordance with various embodiments of the present invention. The Power_estimate 602 is a representation of power consumption in the data processing system, and affects or is roughly proportional to chip temperature. The Power_estimate 602 may be calculated as set forth above in Equations 1-3. A bar graph 604 indicates the operating mode of the data processing system, identifying when the data processing system is operating in normal mode 606 and 610, when it operates in pre-low power mode 612, and when it operates in low power mode 614. When the Power_estimate 602 rises above an upper power threshold 616 and remains above the upper power limit 616 for the duration of an upper power window 620, the scheduler in the data processing system will switch the data processing system from normal mode 606 to pre-low power mode 612.

In pre-low power mode 612, the scheduler is operable to prepare the data processing system to operate in low power mode 614, for example making room in queues (e.g., 422 and 456) before resources (e.g., detector 426) are disabled in low power mode 614 by reducing the maximum number of global iterations so that data is kicked out earlier. In some embodiments, this causes the Power_estimate 602 to begin to fall, as illustrated in FIG. 6, even before resources such as detector 426 are disabled in low power mode 614. In other embodiments, the scheduler may be operable in pre-low power 612 mode to prepare for low power mode 614 in ways that may not substantially reduce power consumption, for example by signaling a data source to slow down data input until queues (e.g., 422 and 456) have sufficient empty space to allow switching to low power mode 614 and disabling resources such as a detector 426.

Once the data processing system is prepared for low power mode 614, for example when sufficient free space is available in queues 422 and 456 to avoid overflows when data detector 426 is disabled, the scheduler switches the data processing system from pre-low power mode 612 to low power mode 614, for example disabling data detector 426, allocating codewords in queues 422 and 426 to use remaining active resources, and changing kick-out rules.

When the Power_estimate 602 falls below a lower power threshold 622 and has remained below the lower power threshold 622 for the duration of a lower power window 624, the scheduler switches the data processing system from low power mode 614 to normal mode 610, increasing system resources again to improve data processing performance once the power consumption has been temporarily reduced to reduce heat. The duration of the upper power window 620 and lower power window 624 may be set to provide the desired cooling based on the thermal requirements of the data processing system and the environment.

Notably, the activity of the processors (e.g., decoder 462) will vary during operation based on the convergence status of data. In the worst case when all data fails to converge without reaching the maximum number of local and global iterations, the data processing system may only be in normal mode 606 for a short period of time, dropping down to pre-low power mode 612 and low power mode 614 after the upper power window 620 period. However, the data processing system may be designed to avoid this worst case during normal operating conditions, allowing the data processing system to operate in normal full power mode with Power_estimate 602 between the upper power threshold 616 and lower power threshold 622 unless particularly noisy conditions exist in some of the data being processed. In other words, the data processing system may be adapted to the expected data source so that the data typically converges without reaching the maximum number of local and global iterations and so that the data processing system operates in normal mode 606 under these conditions, switching to low power mode 614 only when processing unusually noisy data or data with an unusual number of errors.

It should be noted that the various blocks discussed in the above application may be implemented in integrated circuits along with other functionality. Such integrated circuits may include all of the functions of a given block, system or circuit, or a portion of the functions of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel apparatuses, systems, and methods for a data processing system with thermal control. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system with thermal control comprising:
a plurality of data processors comprising a plurality of data detectors and at least one data decoder; and
a scheduler operable to determine a power consumption of the plurality of data processors and to switch the data processing system from a first mode to a second mode and from the second mode to a third mode, wherein the data processing system consumes less power in the third mode than in the first mode, wherein the second mode prepares the data processing system to enter the third mode, wherein the scheduler is operable to reduce a maximum number of global iterations in the data processing system in the second mode to speed up kick-out of codewords from the at least one data decoder, and to disable and enable data processors in the plurality of data processors, and wherein the scheduler is operable to disable some of the plurality of data detectors in the third mode.

2. The data processing system of claim 1, wherein the first mode comprises a normal operating mode, the second mode comprises a pre-low power mode and the third mode comprises a low power mode.

3. The data processing system of claim 1, wherein the plurality of data detectors comprise Maximum a Posteriori detectors and wherein the data decoder comprises a Low Density Parity Check decoder.

4. The data processing system of claim 1, wherein the scheduler is operable to switch the data processing system from the first mode to the second mode when a power consumption of the data processing system has exceeded a threshold for a predetermined duration.

5. The data processing system of claim 1, further comprising at least one memory operable to buffer data between the plurality of data processors, wherein the scheduler is operable to apply kick-out rules in the second mode in the data processing system to increase a data output rate from the data processing system to increase free space in the at least one memory.

6. The data processing system of claim 5, wherein the scheduler is operable to switch the data processing system from the second mode to the third mode after a predetermined amount of free space is available in the at least one memory.

7. The data processing system of claim 1, wherein the scheduler is operable to switch the data processing system from the third mode to the first mode when a power consumption of the data processing system has been below a threshold for a predetermined duration.

8. The data processing system of claim 1, wherein the scheduler is operable to determine a power consumption of the data processing system by adding a power consumption weight of each of the plurality of data processors which are active to yield a power sum, and by calculating a moving average of the power sum using a window to yield an estimate of the power consumption.

9. The data processing system of claim 1, wherein the scheduler is operable to configure a maximum number of local iterations and a maximum number of global iterations in the data processing system, and to disable and enable data processors in the plurality of data processors.

10. The data processing system of claim 1, wherein the data processing system is implemented as an integrated circuit, and wherein the scheduler is operable to reduce a temperature of the integrated circuit by switching the data processing system to the third mode.

11. The data processing system of claim 1, wherein the data processing system is incorporated in a storage device.

12. The data processing system of claim 1, wherein the data processing system is incorporated in a storage system comprising a redundant array of independent disks.

13. The data processing system of claim 1, wherein the data processing system is incorporated in a transmission system.

14. A method for switching operating modes in a data processing system, comprising:
determining a power consumption of the data processing system;
switching from a normal operating mode to a pre-low power operating mode when the power consumption has remained above a first threshold for a first predetermined duration, wherein a maximum number of global iterations in a data decoder and a plurality of data detectors is reduced in the pre-low power operating mode to speed up kick-out of codewords from the data decoder;
switching from the pre-low power operating mode to a low power operating mode when a resource availability in the data processing system reaches a predetermined level, wherein some of the plurality of data detectors are disabled in the low power operating mode, and wherein a temperature of the data processing system is reduced while operating in the low power operating mode; and
switching from the low power operating mode to the normal operating mode when the power consumption has remained below a second threshold for a second predetermined duration.

15. The method of claim 14, further comprising reducing a maximum number of global iterations that can be performed in the data processing system before data is kicked out of the data processing system when operating in the pre-low power operating mode.

16. The method of claim 14, further comprising disabling at least one processor in the data processing system when operating in the low power operating mode.

17. The method of claim 14, further comprising enabling and disabling processors in the data processing system and adjusting kick-out rules in the data processing system when operating in the low power operating mode to reduce power consumption and to resist a reduction in data processing performance.

18. The method of claim 14, wherein determining the power consumption comprises adding a predetermined power consumption weight for each active processor in the data processing system to yield a power sum, and calculating a moving average of the power sum.

19. A storage system comprising:
a storage medium maintaining a data set;
a read/write head assembly operable to sense the data set on the storage medium and to provide an analog output corresponding to the data set;
an analog to digital converter operable to sample a continuous signal to yield a digital output; and
a data processing system with thermal control comprising:
a plurality of data processors comprising a plurality of data detectors and at least one data decoder; and
a scheduler operable to determine a power consumption of the plurality of data processors and to switch the data processing system from a first mode to a second mode and to a third mode, wherein the scheduler is operable to disable ones of the plurality of data processors so that the data processing system consumes less power in the third mode than in the first mode, wherein the second mode prepares the data processing system to enter the third mode whereby at least one memory in the data processing is prevented from overflow when entering the third mode by reducing a maximum number of global iterations in the data processing system to speed up kick-out of codewords from the at least one data decoder, and wherein a temperature of the data processing system is reduced when operating in the third mode at least in part by disabling some of the plurality of data detectors in the third mode.

20. The storage system of claim 19, wherein the scheduler is configured to calculate a power consumption by adding a predetermined power consumption weight for each active processor in the data processing system to yield a power sum, and calculating a moving average of the power sum.

* * * * *